United States Patent
Offermann et al.

(10) Patent No.: US 8,788,625 B2
(45) Date of Patent: Jul. 22, 2014

(54) DISPLAYING APPLICATION CONTENT IN SYNCHRONOUSLY OPENED WINDOW

(75) Inventors: Udo Offermann, Nussloch (DE); Daniel Hutzel, Karlsruhe (DE); Malte Wedel, Munich (DE); Jochen Guertler, Karlsruhe (DE); Nili Avitan, Jerusalem (IL)

(73) Assignee: SAP AG, Walldorf (DE)

( * ) Notice: Subject to any disclaimer, the term of this patent is extended or adjusted under 35 U.S.C. 154(b) by 539 days.

(21) Appl. No.: 12/333,229

(22) Filed: Dec. 11, 2008

(65) Prior Publication Data

US 2010/0153483 A1 Jun. 17, 2010

(51) Int. Cl.
G06F 15/16 (2006.01)

(52) U.S. Cl.
USPC .......................................................... 709/219

(58) Field of Classification Search
CPC .................................................. H04L 29/08072
USPC .......................................................... 709/219
See application file for complete search history.

(56) References Cited

U.S. PATENT DOCUMENTS

| | | | |
|---|---|---|---|
| 6,011,537 A * | 1/2000 | Slotznick | 715/733 |
| 7,167,869 B2 | 1/2007 | Wedel et al. | |
| 7,185,238 B2 | 2/2007 | Wedel et al. | |
| 7,356,600 B2 | 4/2008 | Offermann | |
| 7,404,180 B2 | 7/2008 | Wedel et al. | |
| 7,512,651 B2 | 3/2009 | Offermann | |
| 7,577,672 B2 | 8/2009 | Guertler et al. | |
| 7,606,901 B2 | 10/2009 | Heymann et al. | |
| 7,730,194 B2 | 6/2010 | Offermann | |
| 2003/0009562 A1 | 1/2003 | Heymann et al. | |
| 2003/0074650 A1 * | 4/2003 | Akgul et al. | 717/129 |
| 2003/0208472 A1 * | 11/2003 | Pham | 707/2 |
| 2004/0001094 A1 | 1/2004 | Unnewehr et al. | |
| 2004/0117409 A1 * | 6/2004 | Scahill et al. | 707/200 |
| 2004/0122925 A1 | 6/2004 | Offermann | |
| 2004/0123148 A1 | 6/2004 | Offermann | |
| 2004/0193699 A1 | 9/2004 | Heymann et al. | |
| 2005/0071308 A1 | 3/2005 | Wedel et al. | |
| 2005/0071777 A1 | 3/2005 | Roessler et al. | |
| 2005/0081105 A1 | 4/2005 | Wedel et al. | |
| 2005/0081121 A1 | 4/2005 | Wedel et al. | |
| 2005/0132337 A1 | 6/2005 | Wedel et al. | |
| 2006/0277481 A1 * | 12/2006 | Forstall et al. | 715/764 |
| 2007/0112944 A1 * | 5/2007 | Zapata et al. | 709/221 |
| 2007/0192338 A1 | 8/2007 | Maier et al. | |
| 2007/0214110 A1 | 9/2007 | Guertler et al. | |
| 2007/0214420 A1 | 9/2007 | Guertler et al. | |
| 2008/0189427 A1 | 8/2008 | Offermann et al. | |
| 2008/0313504 A1 | 12/2008 | Wedel et al. | |
| 2010/0146485 A1 | 6/2010 | Guertler | |
| 2010/0162147 A1 | 6/2010 | Ritter et al. | |

* cited by examiner

*Primary Examiner* — Shripal Khajuria

(74) *Attorney, Agent, or Firm* — Fish & Richardson P.C.

(57) ABSTRACT

A computer-implemented method or a computer program product includes identifying a request for a target application and automatically requesting a target application and launching a program to display content associated with the target application. The request for the target application and the launch of the program generally occur nearly simultaneously. The method further includes displaying content associated with the target application with the display program.

30 Claims, 4 Drawing Sheets

DISPLAYING APPLICATION CONTENT IN SYNCHRONOUSLY OPENED WINDOW

TECHNICAL FIELD

This disclosure relates to systems and methods for displaying application content and, more particularly, to near parallelization of application content requests and window opening requests.

BACKGROUND

In web or network applications, new windows are used to display screens in response to navigation from source applications. An inquiry request for a target application opens a new window, but the actual target content or data has to be inquired from the source application running in the parent window. The standard web interaction schema serializes the control flow into a set of discrete steps. First, the inquiry request is performed. Then, the new window is opened, which is a time-consuming operation even in modern browsers. Finally, the application is loaded into the new window. In other words, performing the inquiry request process in series with loading the new browser window often leads to poor performance, especially over slow network connections, because the system can undergo at least two requests plus the extra idle time to open the new browser window.

SUMMARY

In one embodiment, a computer implemented method includes identifying a request for a target application and automatically requesting a target application and launching a program to display content associated with the target application. The request for the target application and the launch of the program generally occur near simultaneously. The method further includes displaying content associated with the target application with the display program.

In one embodiment, a computer implemented system for displaying application content comprises memory for storing data. The system includes at least one processor that can display application content and data on a browser window and identify a request to display a second application on a second window. The system automatically requests a target application and launches the display program to display content associated with the target application, performing both operations substantially simultaneously. The system displays the content associated with the target application on the second window.

The above embodiments can also include one or more of the following features. For example, the simultaneous request and launch occurs in the same JavaScript event handler. Further, identifying a request for the target application can include identifying the address of the target application. In some situations, the request for a target application may be made from a source application that may be running on a server, and/or the target application can be a sub-module of the source application. In various configurations, the method can further include receiving a target address, which further comprises processing the address of the target application on a server running the target application. When the target address is received, it may be stored as a global variable on the system memory.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure relates generally to systems and methods for near parallelization of application content requests and window opening requests. Specifically, this disclosure describes example techniques for increasing performance when launching new application display windows in parallel with requesting content for that new window upon receiving a target application request. Displaying content associated with the target application comprises checking whether the display program is ready to display the content associated with the target application. When the display program is ready, the target application address is handed off to the display program. The display program could be, for example, an interactive browser that displays application content. The browser can be launched to a blank page while awaiting the target application. The features of the above disclosure are often applicable for many types of screen flow that show new information on the screen while keeping the existing information at the same time. For example, from a work list, a new screen is opened to show details of the selected work item in a new window while keeping the work list opened and displayed to the end user in the parent window.

Such example systems and methods can help increase process performance when launching application content. For example, the described techniques can result in increased performance by running the processes in parallel so that the inquiry request is of no consequence for the overall end user waiting time. Modern browser-based user interface frameworks may make use of JavaScript to handle user interactions. Therefore, it is possible to send the inquiry request and open the window in the same JavaScript event handler. Since the target address for the application is not necessarily known, the new window may be opened with an empty page which is loaded from the browser cache (the time to load this empty page can be ignored compared to the server requests and the open window operation). This can lead to two separated threads that may be executed at the same time (e.g., real parallelization): the inquiry request is processed on the server and the new window is opened on the client.

Figure 1:
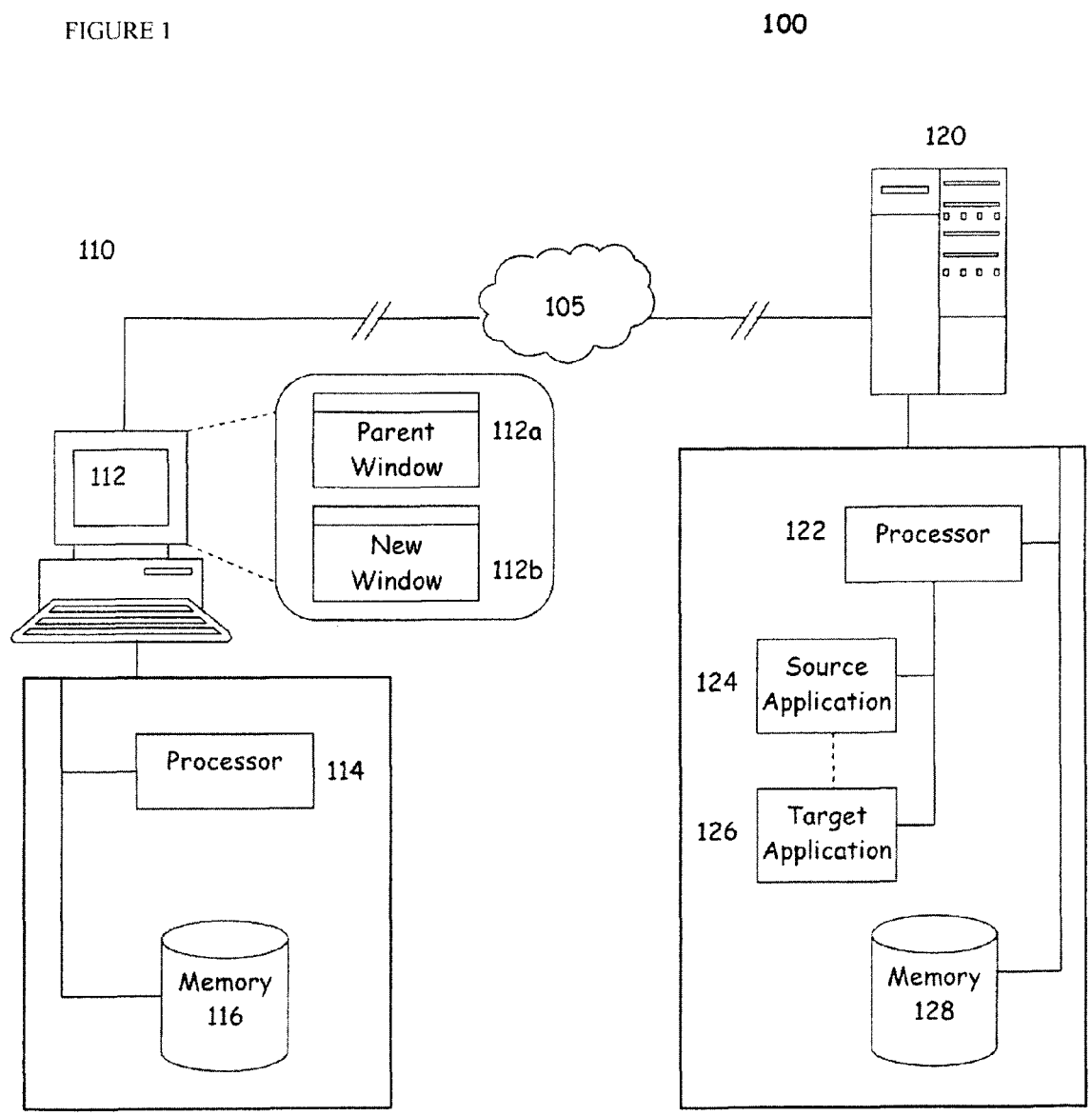
FIG. 1 is a diagram illustrating an embodiment of a system for displaying application content according to a particular implementation of the present disclosure.

Turning to FIG. 1, system 100 illustrates an example embodiment of a client 110 and a server 120 in communication over a network 105. Server 120 comprises an electronic computing device operable to receive, transmit, process and store data associated with system 100. For example, server 120 may be a Java 2 Platform, Enterprise Edition (J2EE)- compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 120 that may be used with the disclosure, system 100 can be implemented using computers other than servers, as well as a server pool. Indeed, server 120 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Server 120 may be adapted to execute any operating system including Linux, UNIX, Windows Server, or any other suitable operating system. According to one embodiment, server 120 may also include or be communicably coupled with a web server and/or a mail server.

Illustrated server 120 includes example processor 122. Although FIG. 1 illustrates a single processor 122 in server 120, two or more processors may be used according to particular needs, desires, or particular embodiments of system 100. Each processor 122 may be a central processing unit (CPU), a blade, an application specific integrated circuit (ASIC), or a field-programmable gate array (FPGA). The processor 122 may execute instructions and manipulate data to perform the operations of server 120, often using software. Regardless of the particular implementation, "software" may include computer-readable instructions, firmware, wired or programmed hardware, or any combination thereof on tangible medium as appropriate. Indeed, each software component may be fully or partially written or described in any appropriate computer language including C, C++, Java, Visual Basic, assembler, Perl, any suitable version of 4GL, as well as others. It will be understood that while the applications illustrated in FIG. 1 is shown as individual modules that implement the various features and functionality through various objects, methods, or other processes, the applications may instead include a number of sub-modules, third-party services, components, libraries, and such, as appropriate. Conversely, the features and functionality of various components can be combined into single components as appropriate.

In the illustrated embodiment, processor 122 processes and communicates, for example, applications 124 and 126 via a network to the client 110 operating electronic computing device 112. At a high level, the server 120 and processor 122 are operable to identify, receive, and/or process requests from users and present applications to the particular user via an interface. Source application 124 and target application 126 can be run from server 120. Source application 124 is generally considered to be any software program or service that presents information to client 104. Examples of source application 124 could include various business applications, whether located on a local server or hosted by a service provider at a particular URL. In some instances, a business application may execute or provide a number of application services, including customer relationship management (CRM) systems, human resources management (HRM) systems, financial management (FM) systems, project management (PM) systems, knowledge management (KM) systems, and electronic file and mail systems. The business application may be operable to exchange data with a plurality of enterprise-based systems and, in the process, update or modify one or more content repositories. The various services performed may allow the business application to orchestrate one or more business processes in synchronization with other processes that directly or indirectly affect the information stored within one or more of the content repositories. For instance, the business application may drive business processes across different applications, systems, technologies, and organizations, thus driving end-to-end business processes across heterogeneous systems or sub-systems. With that in mind, target application 126 can include a service, sub-module, or sub-domain of source application 124 or it can be applications that are otherwise communicably coupled (or logically related) to source application 124 such that a new window or display is opened to present subsequent content associated with that target. For example, source application 124 can be a work list with selectable work items, which could represent target applications 126. From the work list, details of the selected work item can be viewed in a new window while keeping the work list opened and displayed to the end user in the parent window.

Server 120 can include memory 128. Illustrated memory 128 represents any tangible memory or database module and may take the form of volatile or non-volatile memory including, without limitation, magnetic media, optical media, random access memory (RAM), read-only memory (ROM), removable media, or any other suitable local or remote memory components. But memory may also include any other appropriate data such as HTML files, data classes or object interfaces, unillustrated software applications or sub-systems, and so on.

Client 110 is any computing device operable to process data for an end user. For example, it may connect or communicate with the server 120 or the network 105 using a wireless connection, or it may be a stand-alone device. At a high level, each client 110 includes at least a an electronic computing device operable to receive, transmit, and process any appropriate data. Electronic computing device can comprise a processor 114 and memory 116. For example, application data can be stored in a cache of memory 116.

It will be understood that there may be any number of clients communicably coupled to the server 120. For example, the clients can include one local client and three external clients to the illustrated portion of the network. It will also be understood that client 110 may be communicably coupled to any number of servers through network 105. Further, "client" and "user" may be used interchangeably as appropriate without departing from the scope of this disclosure. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device. For example, the client may be a laptop that includes an input device, such as a keypad, touch screen, mouse, or other device that can accept information, and an output device that conveys information associated with the operation of the server or the clients, including digital data, visual information, or the user interface. Both the input device and output device may include fixed or removable storage media such as a magnetic computer disk, CD-ROM, or other suitable media to both receive input from and provide output to users of the clients through the display, namely the user interface.

The computer also includes a user interface 112, such as a graphical user interface (GUI). The GUI 112 comprises a graphical user interface operable to, for example, allow the user of the client to interface with at least a portion of the platform for any suitable purpose, such as creating, preparing, requesting, or analyzing analytics and associated queries and reports. Generally, the GUI provides the particular user with an efficient and user-friendly presentation of business data provided by or communicated within the system. The GUI may comprise a plurality of customizable frames or views having interactive fields, pull-down lists, and buttons operated by the user. The GUI is often configurable, supports a combination of tables and graphs (bar, line, pie, status dials, etc.), and is able to build real-time portals, where tabs are delineated by key characteristics (e.g., site or micro-site). Therefore, the GUI contemplates any suitable graphical user interface, such as a combination of a generic web browser, intelligent engine, and command line interface (CLI) that processes information in the platform and efficiently presents the results to the user visually. The server can accept data from the client via the web browser (e.g., Microsoft Internet Explorer or Mozilla Firefox) and return the appropriate HTML or XML responses to the underlying engine using the network. Modern browser-based user interface frameworks can make use of JavaScript to handle user interactions. Therefore it is possible to send the inquiry request and open the new window in the same JavaScript event handler.

Furthermore, the GUI 112 is operable to display content from local or server-based applications. For example, a source application 124 can be displayed via a parent browser window 112a. Likewise, a target application 126 can be displayed via a new browser window 112b. It will be understood that any number of browser windows can be displayed by electronic computing device 112 to display application content, such as a second window associated with target data requested by the client 104, user, or source application. The display program operable to display application content can launch a blank page while awaiting data associated with the application from over the network 105.

The network 105 facilitates wireless or wireline communication between the server 120 and any other local or remote computer, such as the client 110. The network 105 may be all or a portion of an enterprise or secured network. In another example, the network 105 may be a virtual private network (VPN) merely between the server 120 and the client 110 across wireline or wireless link. Such an example wireless link may be via 802.11a, 802.11b, 802.11g, 802.11n, 802.20, WiMax, and many others. While described as a single or continuous network, the network may be logically divided into various sub-nets or virtual networks without departing from the scope of this disclosure, so long as at least portion of the network may facilitate communications between the server and at least one client. In other words, the network 105 encompasses any internal or external network, networks, sub-network, or combination thereof operable to facilitate communications between various computing components in the system. The network 105 may communicate, for example, Internet Protocol (IP) packets, Frame Relay frames, Asynchronous Transfer Mode (ATM) cells, voice, video, data, and other suitable information between network addresses. The network 105 may include one or more local area networks (LANs), radio access networks (RANs), metropolitan area networks (MANs), wide area networks (WANs), all or a portion of the global computer network known as the Internet, and/or any other communication platform or systems at one or more locations. In certain embodiments the network 105 may be a secure network associated with the system 100 and certain local or remote clients 110.

In the embodiment illustrated in FIG. 1, client 110 is operable to process and display application content of a source application 124. The source application 124 can be stored and run off of the server 120 or, alternatively, stored and run locally. The source application 124 is displayed on electronic computing device 112 on a parent browser window 112a. The source application 124 is configured such that the user 110 can interface with it through the browser 112a to make inquiries for other applications run off a server or locally. The target applications 126 can include sub-modules of the source application 124 or can be applications that are unrelated but are communicably coupled to the source application 124. The other applications, or target applications, are configured to be launched in new browser windows upon a client inquiry request. Content associated with target application 126 can be requested through source application 124.

Figure 2:
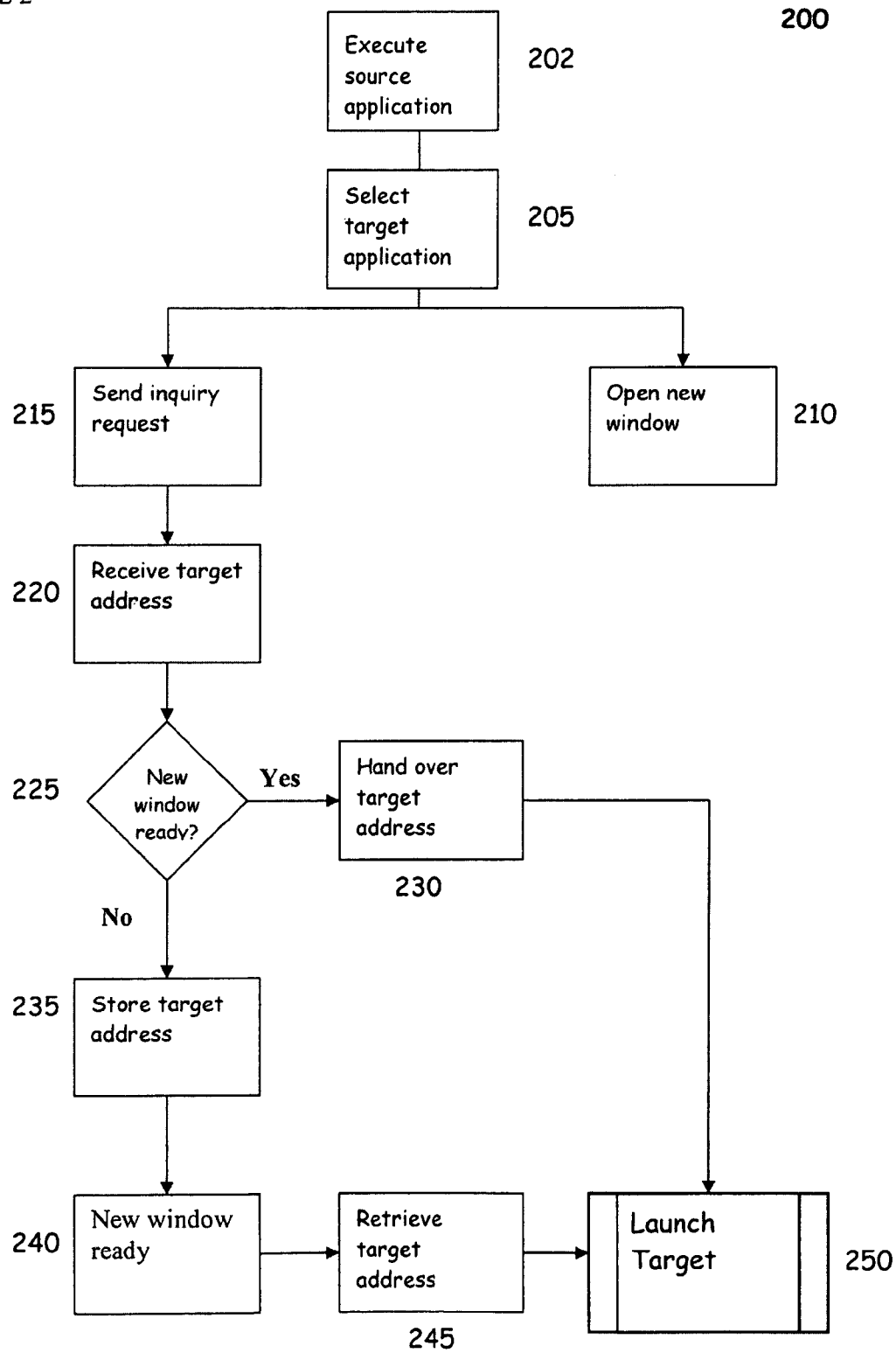
FIG. 2 is a flowchart illustrating an example parallel process flow using an appropriate system, such as the system described in FIG. 1.

FIG. 2 is a flowchart showing an example process 200 for parallel pathway flow for displaying application content implementing system 100. In general, a source application 124 is executed on the client device 112 (step 202). An inquiry request is made to access to the target application 126 through the source application 124. The processor 122 running source application 124 may process the request and compute the address for the target application 126. Alternatively, source application 124 can process the request and compute the address for the target application 126. The source application 124 may then return the address to the parent window 112a of client device 112.

In an embodiment, a source application can be executed by, for example, a user 110 operating a client device 112. The source application can be displayed on a parent browser window 112a (step 202). For example, the source application 124 could be a web-based program or a program run locally or over a network 105. The source application 124 can be configured to provide access to a target application 126 by opening a new browser window 112b upon an inquiry request. The target application 126 could be, for example, a web-based program or a local or network program accessible through the source application 124. In certain embodiments, the target application 126 can include a sub-module of the source application 124. Modern browser based user interface frameworks can make use of JavaScript to handle user interactions. Therefore, it is possible to send the inquiry request and open the new window in the same JavaScript event handler.

An inquiry request to access a target application 124 is made (step 205). The inquiry request can be made by, for example, a user or automatically. The inquiry request may be run in parallel to loading the new window 112b (step 210). Since the target address may not be known, in certain embodiments, the new window 112b can be opened with an empty page that can be loaded from the browser cache. The time to load the empty page is minimal and can be ignored compared to the server requests and the open window operation. This operation may lead to two threads that are executed at the same time (i.e., in parallel): the inquiry request is processed on the server while the new window is opened on the client device.

The time for the inquiry request and launching the new window 112b are in the same range (e.g., on the order of several hundred milliseconds), but one operation will be completed before the other one, thus, they may be synchronized again on the client side. Turning back to the embodiment illustrated in FIG. 2, the inquiry request is sent at step 215. The parent window 112a receives a target address from the inquiry request (step 220). The target address could be, for example, a uniform resource identifier (URI) such as a uniform resource locator (URL); or the address could be any addressing data associated with the application content. The target address can include a logical identifier of the target application 126, which can be stored on server 120.

The parent window 112a, the event handler, or other suitable logic checks whether the new window 112b is ready (step 225). If the new window 112b is ready, the parent window hands over the target address to the new window 112b (step 230) and the new window 112b is displayed to the user 110 on the client device 112 (step 250).

If the new window is not ready, the target address is stored in, for example, a global variable 235 until the new window is ready (step 240). The target address, or the already received target data, can be stored in cache of memory 116. Once the new window is ready, the new window asks the parent, or memory, for the target address (steps 245). The target application is then launched in the new window (step 250).

Figure 3:
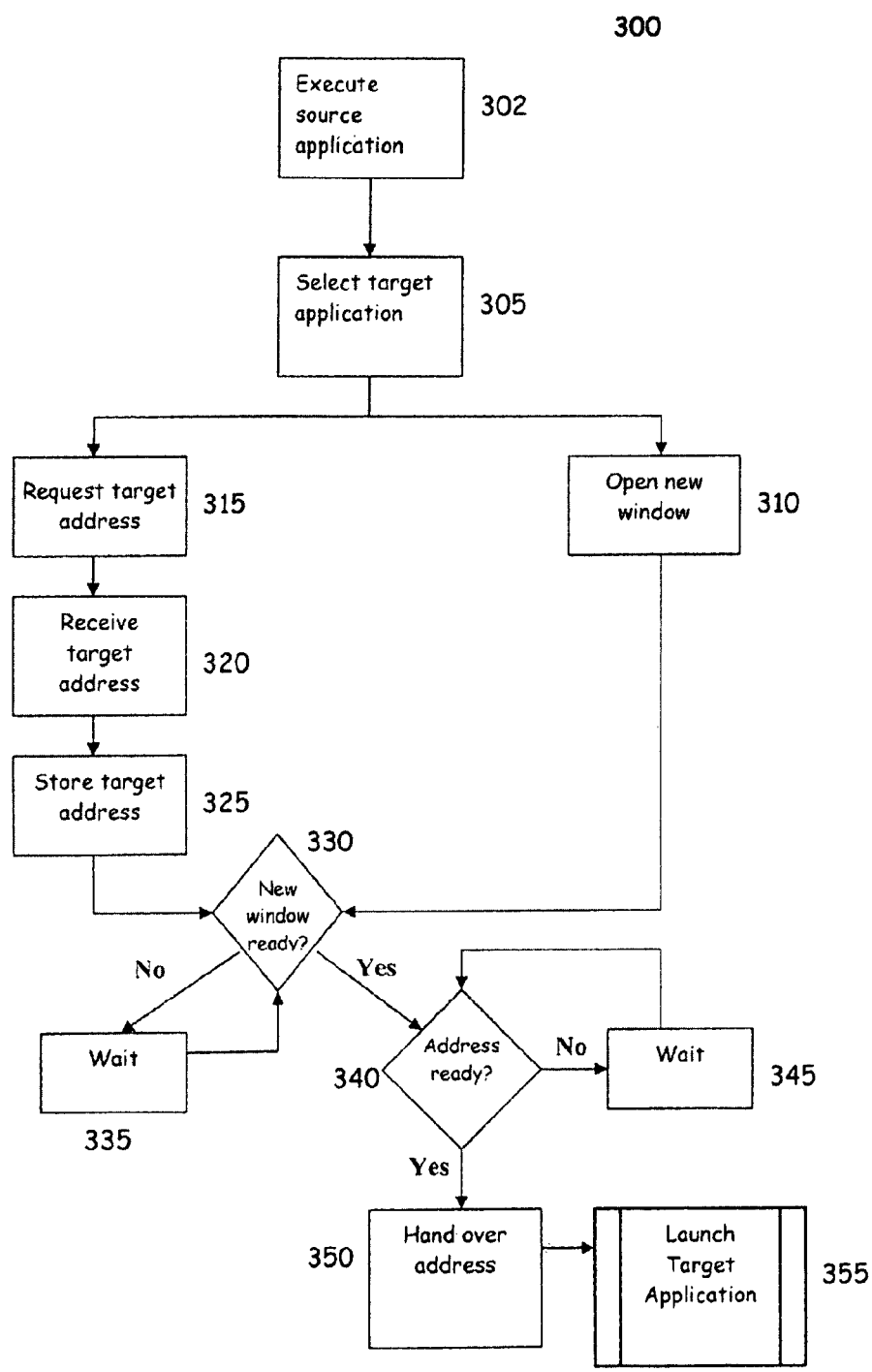
FIG. 3 is a flowchart illustrating another example parallel process flow using an appropriate system, such as the system described in FIG. 1.

FIG. 3 illustrates a flowchart showing an alternative embodiment of the parallel process flow 300 implemented on, for example, system 100. In an embodiment, each thread of the parallel process may perform a check on the other thread to further ensure synchrony between the threads. When the first window 112a receives the target address from the inquiry request, the first window 112a may check whether the second window 112b is ready. If the second window 112b is ready, the first window 112a communicates the target address to the second window 112b, which is subsequently displayed to the user 110 operating the client device 112. If the second window 112b is not ready, the first window 112a schedules another check using, for example, the built-in JavaScript functionality of the browser 112a. The first window 112a then checks whether the second window 112b is ready, and the process repeats until the target application content is displayed to the user 110.

In an embodiment, a source application 124 may be run on a client device 112 that is displayed on a first browser window 112a (step 302). An inquiry request to access a target application 124 is made (step 305). The inquiry request can be, for example, a request made by the user 110 or automatically. The inquiry request is run in parallel to launching the second window 112b (step 310). Since the target address may not be known, in certain embodiments, the second window 112b can be opened with an empty page that can be loaded from the browser cache. The time to load the empty page is minimal and can be ignored compared to the server requests and the open window operation. This operation may lead to two threads that are executed at the same time (i.e., in parallel): the inquiry request is processed on the server while the second window is opened on the client device.

The time for the inquiry request and launching the second window 112b are in the same range (e.g., on the order of several hundred milliseconds), but one operation will be completed before the other one, thus they may be synchronized again on the client side. Turning back to the embodiment illustrated in FIG. 3, the inquiry request is sent at step 315. The first window 112a receives a target address from the inquiry request (step 320). The target address could be, for example, a uniform resource identifier (URI) such as a uniform resource locator (URL); or the address could be any addressing data associated with the application content. The target address can include a logical identifier of the target application 126, which can be stored on server 120.

The target address may be stored as a global variable (step 325). The target address can be stored in cache of memory 116. The first window 112a, the event handler, or other suitable logic checks whether the second window 112b is ready (step 330). If the second window 112b is not ready, the first window 112a may schedule a next check for the second window 112b in a set time (e.g., 30 milliseconds) (step 335). In certain embodiments, the first window 112a may schedule the next check using, for example, built-in JavaScript functionality.

Once the second window 112b is ready, the second window 112b may ask the first window 112a for the target address (steps 340). If the address is not ready, the second window 112b may schedule a next check in a set time (e.g., 30 milliseconds) (step 345). If the target address is ready, the target address may be handed over to the second window 112b (step 350). The application 126 can then be displayed to the user 110 (step 355).

Figure 4:
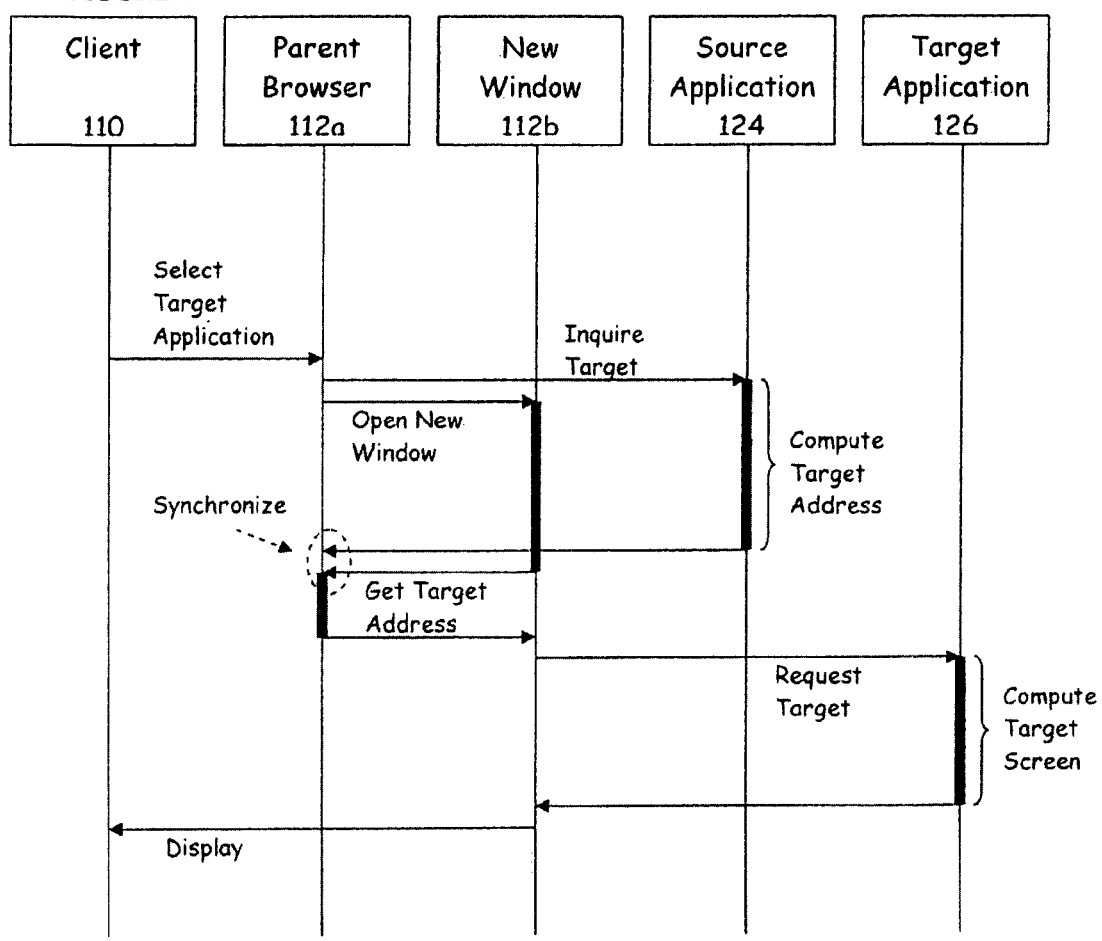
FIG. 4 is a diagram illustrating the pathways for parallel process flow for displaying application content.

FIG. 4 is the swim diagram showing the process 400 implemented on system 100. In general, FIG. 4 illustrates the process flow where upon an inquiry request for a target application 126 by the client 110 running a source application 124, the inquiry request is executed in parallel with launching a new browser window 112b. Specifically, FIG. 4 shows the parallel process 400 and its synchronization. Once the target address has been acquired and the new window 112b has been launched, the new window 112b retrieves the target address from the parent window 112a. The target application content 126 is computed and communicated to the new window 112b. It is then displayed to the user 110 on the client device 112.

The time for the inquiry request and launching the new window 112b are in the same range (e.g., on the order of several hundred milliseconds), but one operation will be completed before the other one, thus they may be synchronized again on the client side. FIG. 4 illustrates the synchronization of the parallel process flow at parent browser window 112a. After the new window 112b is opened and the target address is computed and received, the process continues by computing the target screen from the application content. Then, the target application 126 is displayed to the client.

The preceding figures and accompanying description illustrate processes and implementable techniques. But system 100 (or its other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, system 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   identifying a request for a target application from a first window;
   requesting, in parallel using at least one computer, a target application address and a launch of a second window to display target application data associated with the target application, wherein the target application address is associated with the target application and is computed by a source application associated with the first window;

synchronizing the launch of the second window with the return of the target application address;
requesting target application data from the target application based on the returned target application address; and
displaying the target application data in the second window, wherein displaying the target application data includes:
checking whether the second window is ready for the target application data; and
if the second window is not ready, caching the target application data until the second window is ready.

2. The method of claim 1, wherein the parallel request occurs automatically.

3. The method of claim 1, wherein the request for the target application address is made from a source application presenting information in the first window, wherein the first window is a parent to the second window.

4. The method of claim 1, wherein the target application comprises a sub-module of a source application.

5. The method of claim 1, wherein the second window comprises a browser.

6. The method of claim 5, wherein the browser is launched to a blank page while awaiting the target application data.

7. The method of claim 1, wherein the parallel request and launch each occurs in a separate event handler.

8. The method of claim 1, wherein the parallel request and launch occur in a single event handler.

9. The method of claim 1, wherein the parallel requesting step is performed by the first window.

10. The method of claim 9, wherein requesting the target application address further includes storing the target application address as a global variable.

11. The method of claim 9, wherein the target application address includes a logical identifier of the target application stored on a remote server.

12. The method of claim 1, wherein displaying the target application data comprises handing off the target application address to the second window.

13. The method of claim 1, wherein the synchronization step is performed by the first window.

14. The method of claim 1, wherein the target application address is computed by a source application.

15. The method of claim 1, wherein the requesting of the target application data from the target application is performed by the second window.

16. A system comprising:
memory for storing data; and
at least one processor operable to:
identify a request for a target application from a first window;
request, in parallel, a target application address and a launch of a second window to display target application data associated with the target application, wherein the target application address is associated with the target application and is computed by a source application associated with the first window;
synchronize the launch of the second window with the return of the target application address;
request target application data from the target application based on the returned target application address; and
display the target application data in the second window, wherein display of the target application data includes:
a check of whether the second window is ready for the target application data; and
if the second window is not ready, caching the target application data until the second window is ready.

17. The system of claim 16, wherein the parallel request occurs automatically.

18. The system of claim 16, wherein the request for the target application address is made from a source application presenting information in the first window, wherein the first window is a parent to the second window.

19. The system of claim 16, wherein the target application comprises a sub-module of a source application.

20. The system of claim 16, wherein the second window comprises a browser.

21. The system of claim 20, wherein the browser is launched to a blank page while awaiting the target application data.

22. The system of claim 16, wherein the parallel request and launch occur in a single event handler.

23. The system of claim 16, wherein the parallel requesting step is performed by the first window.

24. The system of claim 23, wherein the request for the target application address further comprises storing the target application address as a global variable.

25. The system of claim 23, wherein the target application address includes a logical identifier of the target application stored on a remote server.

26. The system of claim 16, wherein the displaying of the target application data comprises a hand-off of the target application address to the second window.

27. The system of claim 16, wherein the parallel request and launch each occurs in a separate event handler.

28. The system of claim 16, wherein the synchronization step is performed by the first window.

29. The system of claim 16, wherein the target application address is computed by a source application.

30. The system of claim 16, wherein the requesting of the target application data from the target application is performed by the second window.

* * * * *